United States Patent [19]

Piesinger et al.

[11] Patent Number: 4,835,536

[45] Date of Patent: May 30, 1989

[54] WEATHER RADAR WITH TURBULENCE DETECTION

[75] Inventors: Greg H. Piesinger, Cave Creek; Steve D. Neuharth, Phoenix, both of Ariz.

[73] Assignee: Honeywell Inc., Minneapolis, Minn.

[21] Appl. No.: 101,889

[22] Filed: Dec. 21, 1987

[51] Int. Cl.[4] .............................................. G01S 13/95
[52] U.S. Cl. ....................................... 342/26; 342/189
[58] Field of Search ........................... 342/26, 159, 189

[56] References Cited

U.S. PATENT DOCUMENTS

| | | | |
|---|---|---|---|
| 3,573,824 | 4/1971 | Armstrong et al. | 342/26 |
| 3,646,555 | 2/1972 | Atlas | 342/26 |
| 3,715,748 | 2/1973 | Hicks | 342/26 |
| 3,938,145 | 2/1976 | Brook et al. | 342/26 |
| 4,015,257 | 3/1977 | Fetter | 342/26 |
| 4,139,847 | 2/1979 | Shimzu et al. | 342/26 |
| 4,649,388 | 3/1987 | Atlas | 342/26 |
| 4,688,318 | 12/1986 | Alitz | 342/26 |
| 4,710,772 | 12/1987 | Cantwell et al. | 342/26 |

OTHER PUBLICATIONS

Skolnik, "Introduction to Radar Systems".

Primary Examiner—Thomas H. Tarcza
Assistant Examiner—Mark Hellner
Attorney, Agent, or Firm—John G. Shudy, Jr.

[57] ABSTRACT

A weather radar turbulence detector using a magnetron for transmission and having pulse pair processing. The invention is a high-power, low cost turbulence detector incorporating ground clutter rejection and sea clutter rejection. Autocorrelation among echoes, to note their amplitude variations, which are detected video, rather than RF, from a simple and low-cost receiver, from pulse to pulse of the transmitter, is accomplished by the pulse pair processing.

6 Claims, 12 Drawing Sheets

MAGNETRON TRANSFER FUNCTION

PUSHING FIGURE

1 MHz / AMPERE    (TUBE SPEC)

10 KHz ⇒ 10 mA = $\Delta I$

$\Delta V = \Delta I \times Z_{dynamic} = 0.01 \times 150 = 1.5V$     VOLTAGE REGULATION = $\dfrac{1.5V}{2000V}$ = 0.08%

CURRENT REGULATION = $\dfrac{0.01A}{2A}$ = 0.5%

WEATHER RADAR WITH TURBULENCE DETECTION

FIELD OF THE INVENTION

The invention pertains to radio frequency (RF) generation and signal processing. In particular, the invention pertains to magnetron transmitters and pulse pair processing (PPP) of weather radar echo signals. More particularly, the invention involves weather radar having turbulence detection with rejection of ground clutter and sea clutter.

RELATED ART

The related art uses low power (e.g., 20 watts) solid state transmitters in weather radar having turbulence detection. These systems are expensive, provide poor range resolution and require long transmitter pulses (i.e., widths). An alternative solution, using a magnetron for detecting turbulence, was rejected in the art because of the magnetron's poor frequency stability.

SUMMARY OF INVENTION

The present invention incorporates a high power (i.e., 1000 watts) magnetron transmitter costing about one-tenth of the cost of low power solid state transmitters of the related art. High power improves long-range performance. The invention comprises a constant current modulator combined with a digital signal processor capable of pulse pair processing (PPP) for detecting turbulence with a magnetron. The invention can also reject ground and sea clutter.

BRIEF DESCRIPTION OF THE DRAWINGS

FIG. 4b shows the frequency content of the sampled waveform of FIG. 4a.

DESCRIPTION OF THE PREFERRED EMBODIMENT

A radar system operates by transmitting a short pulse of RF energy and listening to the returned echo signal. Target range is determined from the time delay between pulse transmission and echo reception. Target reflectivity is determined from the amplitude of the echo signal. Each pulse and its echo constitute one radar radial. Radials are typically transmitted at a pulse repetition frequency (PRF) of 180 to 1600 Hz.

Figure 1A:
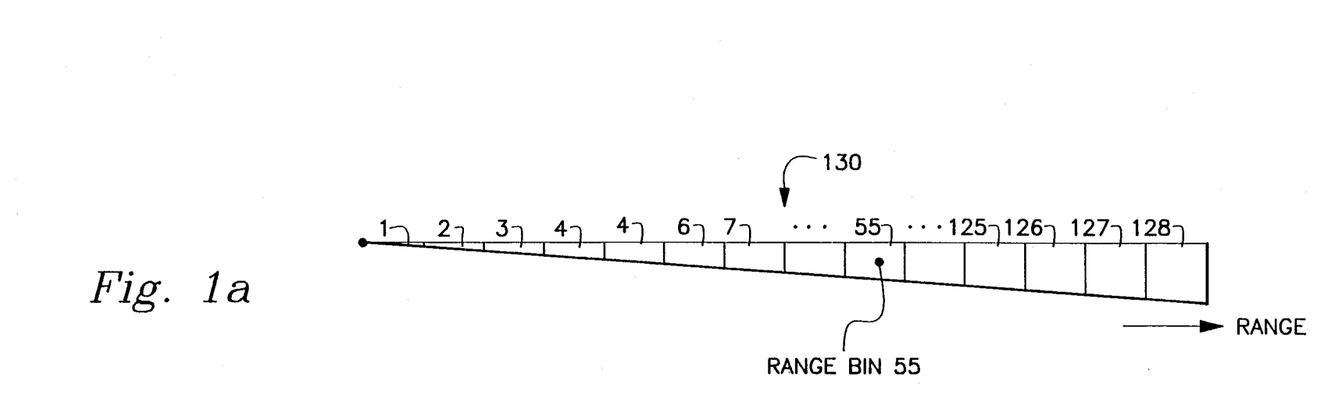
FIG. 1a illustrates a single transmitted radial divided into 128 range bins, with emphasis on range bin 55.
Figure 1B:
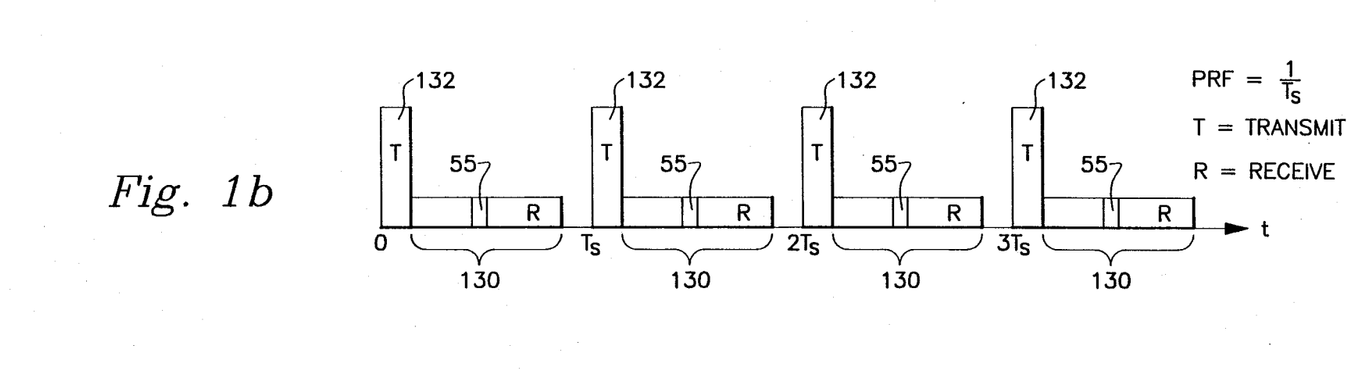
FIG. 1b illustrates four transmitted radials.
Figure 1C:
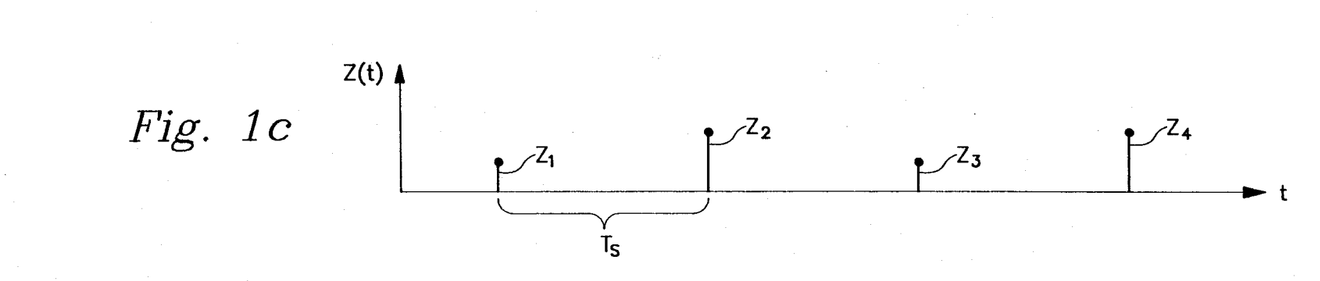
FIG. 1c illustrates received echo signals for range bin 55.

FIG. 1a illustrates a radial divided into 128 range bins. Returned echo 130 is divided into segments designated as range bin 1 through 128. Each range bin is processed identically like every other range bin. The processing of range bin 55 is described as an example. FIG. 1b illustrates four radials 130 and the position of range bin 55 in each received echo of transmitted pulse 132. FIG. 1c illustrates probable echo amplitudes $Z_1$-$Z_2$ for range bin 55. $T_s$ is the duration between transmitted pulses.

Figure 2:
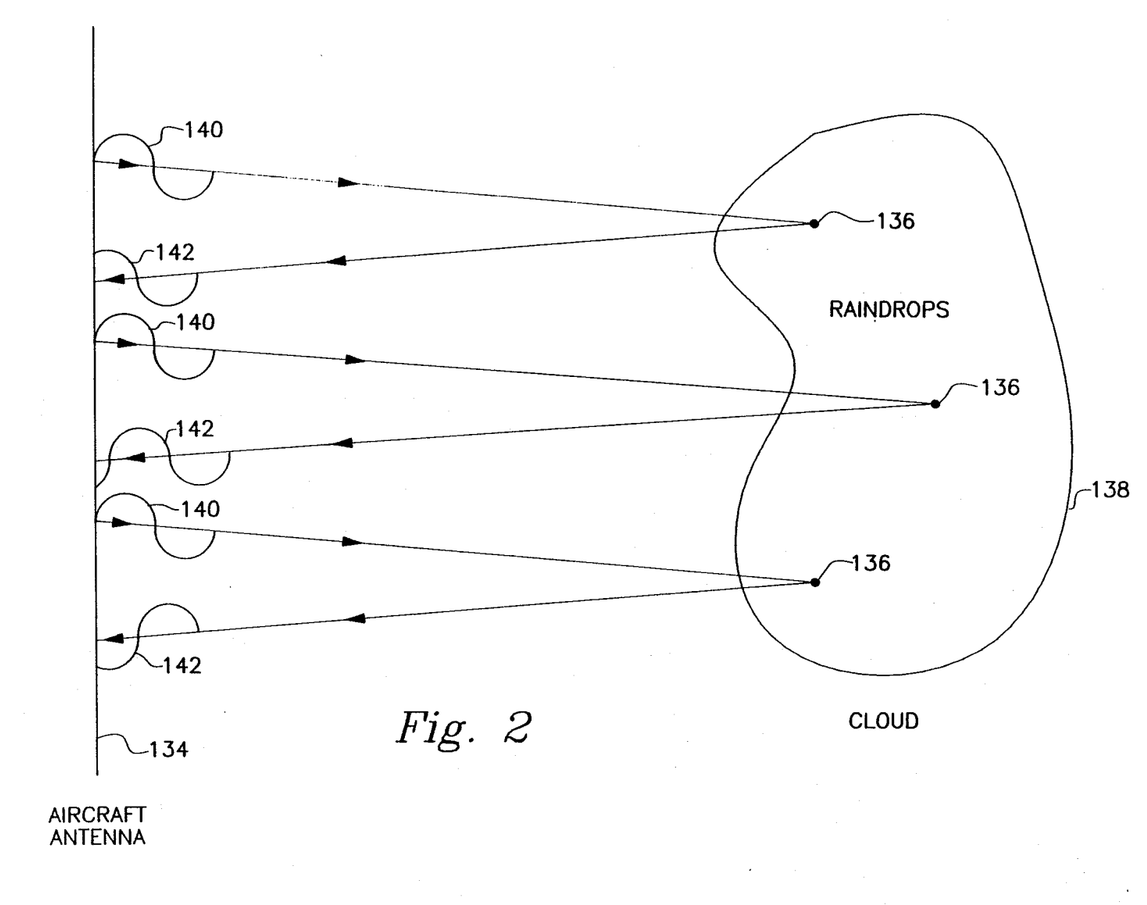
FIG. 2 shows the phase relationships among echo signals from various raindrops.

FIG. 2 partially illustrates a radial 130 being composed of the echoes returned from some of the millions of individual raindrops 136 in cloud 138. FIG. 2 reveals the phase relationships among the echo signal from three particular raindrops 136 by showing the path of transmitted wavelets 140 and their return from each raindrop 136. The phase of each returned wavelet 142 depends on the distance (in wavelengths) between aircraft antenna 134 and raindrop 136.

Figure 3A:
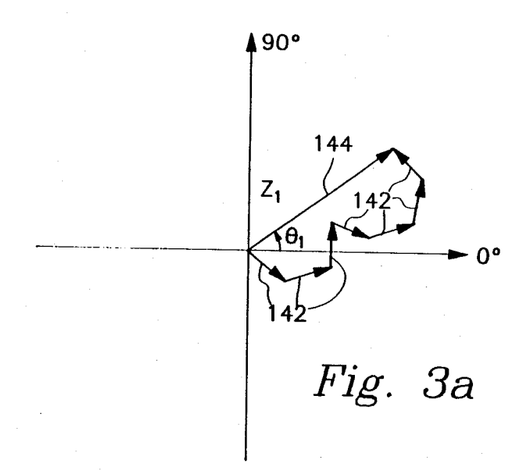
FIG. 3a shows the phase relationship among the range bin 55 echo signals from various raindrops for the first transmission.

Each of wavelets 142 add vectorially in antenna 134 to produce the amplitude and phase of the signal 144 in range bin 55. This vector sum 144 is illustrated in FIG. 3a for seven wavelets 142. The resulting signal 144 has amplitude $Z_1$ and phase $\theta_1$ for the first radial 130.

Figure 3B:
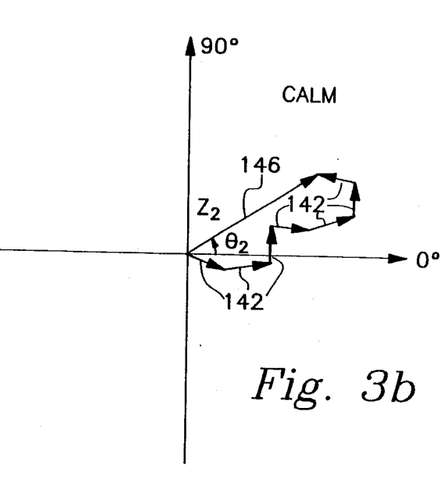
FIG. 3b shows the phase relationship among echo signals from various raindrops for a second transmission when the rainfall is calm.

If the rainfall is calm and the PRF is high, then the individual raindrops 136 will not move significantly between radials 130 If their positional change is small, the phase change of each wavelet 142 will also be small. This is illustrated in FIG. 3b for the second radial 130 in calm conditions. Phase $\theta_2$ and amplitude $Z_2$ of the vector sum 146 are nearly identical to that of vector sum 144.

Figure 3C:
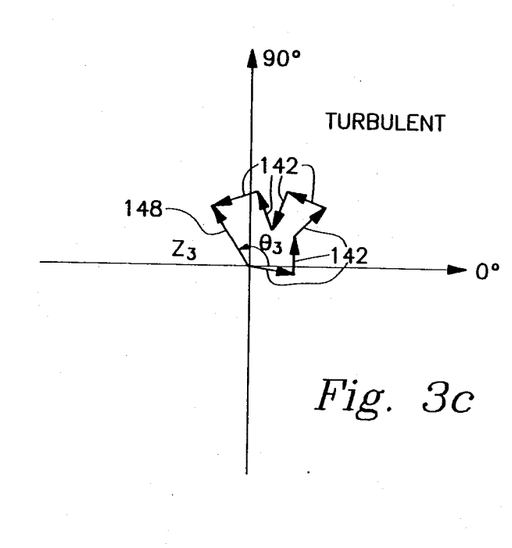
FIG. 3c shows the phase relationship among echo signals from various raindrops for a second transmission when the rainfall is turbulent.

If the rainfall is turbulent, the positional change of each raindrop 136 will be large. This alters the phase of each of the echo wavelets 142 which results in vector sum 148 whose amplitude $Z_3$ and phase $\theta_3$ are very different than that of vector sum 144.

FIGS. 3a, 3b and 3c, in summary, illustrate the basic physics behind turbulence detection. To detect turbulence, it is only necessary to measure the difference between either the amplitude or the phase (or both) of the echoes from two consecutive radials 130. If the difference is small, the rainfall is calm. If the difference is large, the rainfall is turbulent. Radar returns from rainfall can be used to estimate the spread of wind velocities within a storm. The present invention measures the difference of amplitudes of the echoes.

This method of turbulence detection is valid only if the frequency of the transmitted pulse is the same for each pair of radials 130. If the transmitted frequency changes, the distance (in wavelengths) between antenna 134 and raindrops 136 change even if the raindrops 136 themselves do not change. This would change the phase of each wavelet 142 and hence vector sum 146 or 148 would have a different amplitude and phase with respect to vector sum 144. This would cause calm rainfall to appear turbulent and diminish turbulence detection capability of the present method.

FIGS. 3a, 3b and 3c also illustrate that the received phase of each radial 130 is not important if all that is processed are amplitudes $Z_1$ and $Z_2$ or $Z_3$. If the received phase of second radial 130 were different than phase of first radial 130, then phase $\theta_2$ of vector sum 146 would be different from the phase $\theta_1$ of vector sum 144, but amplitudes $Z_1$ and $Z_2$ would be the same. Since the present invention processes only amplitudes $Z_1$ and $Z_2$ or $Z_3$, phase relations are not a factor. This is important because the phase of the transmitted pulse 132 from a magnetron is arbitrary.

In summary, the invention depends on the factor that turbulence causes both amplitudes and the phases of vector sum 148 to vary with respect to those of vector sum 144. Thus, turbulence can be detected by simply measuring amplitude scintillation between adjacent radials 130. Since it is not necessary to measure phase variations, it is not necessary to control the transmitter phase. Hence, controlling the transmitted spectrum of a magnetron between consecutive radials 130 is sufficient to permit turbulence detection with a magnetron transmitter.

Figure 4A:
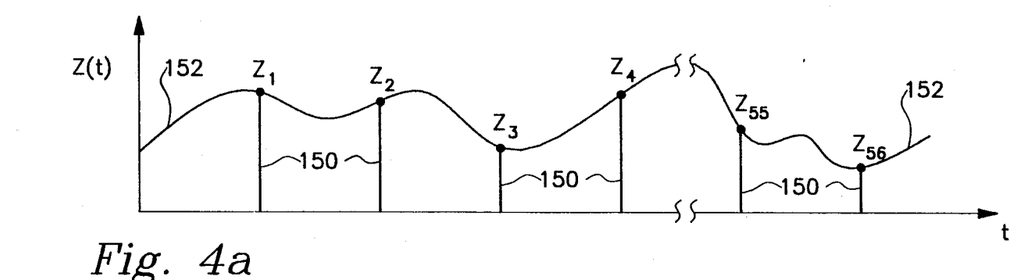
FIG. 4a shows the amplitudes of the echo signals for consecutive transmissions for range bin 55.
Figure 4B:
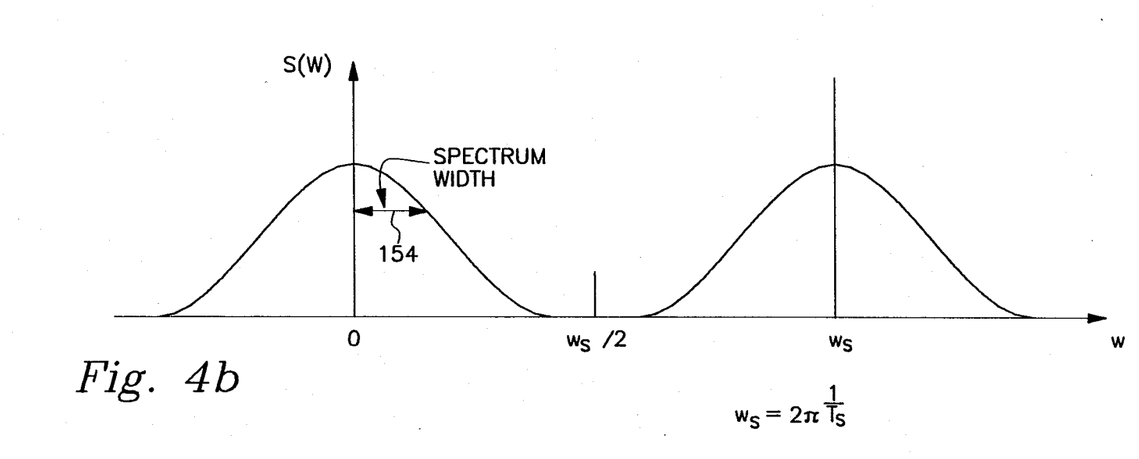

Pulse pair processing (PPP) is incorporated in a digital signal processor that measures the amplitude scintillation between consecutive radials and thereby detects turbulence. FIGS. 4-8 show the operating principles of PPP. FIG. 4 illustrates the returns from range bin 55 for 56 radials 130. Since only one return 150 is obtained for each radial 130, one effectively is sampling the underlying continuous amplitude variation 152 of range bin 55. Variation 152 would be seen if range bin 55 were illuminated with continuous wave (CW) radar instead of pulse radar.

FIG. 4b illustrates the frequency content resulting from the waveform in FIG. 4a. Large amplitude scintillation (turbulent rainfall) results in a wide spectrum width 154 while small amplitude scintillation (calm rainfall) produces a narrow spectrum width 154. Since the waveform 152 is sampled, the spectrum is repeated at the sampling frequency $w_s$. To prevent frequency aliasing, the sampling rate (PRF) must be larger than the spectrum width 154. A PRF of 1400 to 1600 Hz is used.

Figure 5A:
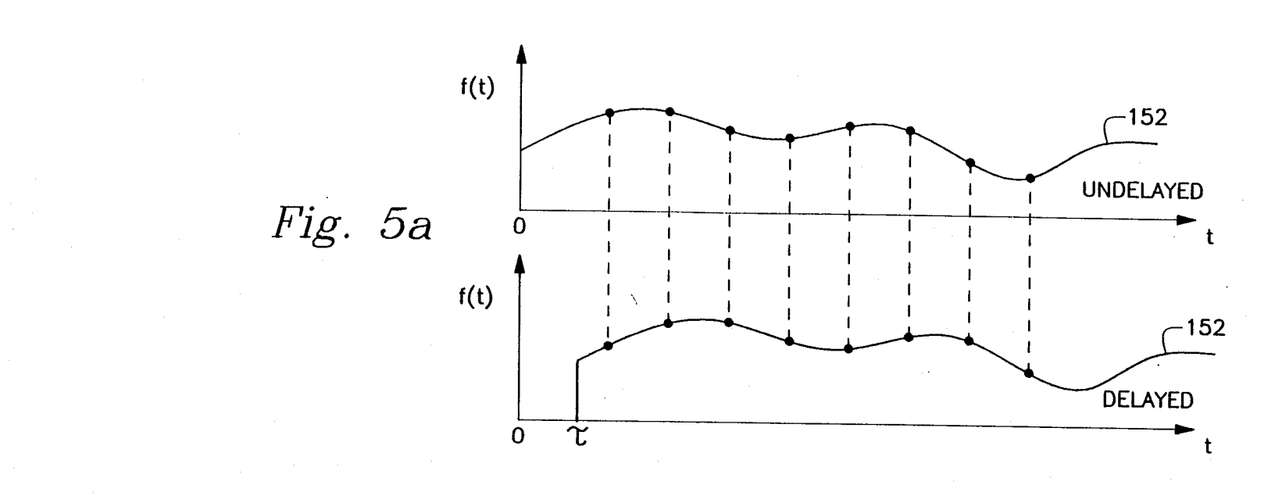
FIG. 5a illustrates the autocorrelation function of a waveform.
Figure 5B:
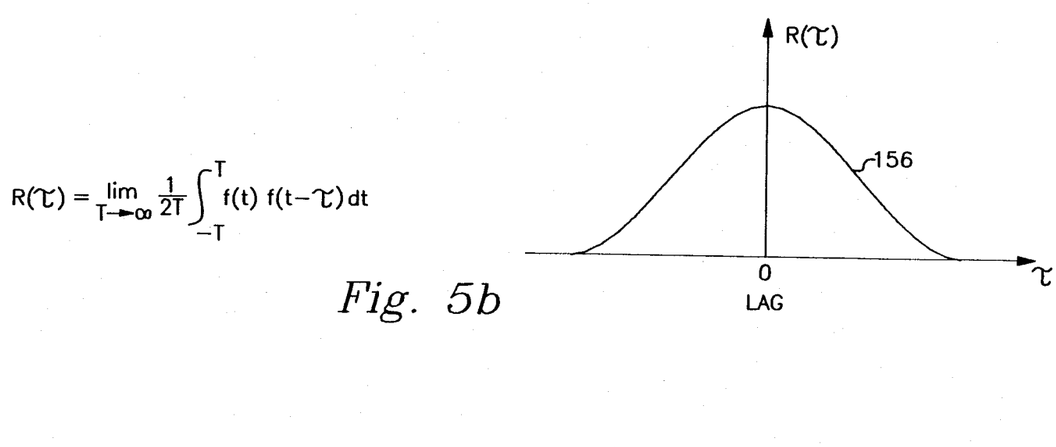
FIG. 5b illustrates the autocorrelation function of the waveform as evaluated.

An efficient way to measure the spectrum width 154 of the sampled waveform is with PPP. PPP does not measure spectrum width 154 directly but rather measures the autocorrelation function which is related to spectrum width 154. FIGS. 5a and 5b illustrate how an autocorrelation function is measured. If a continuous waveform 152 is delayed by lag T, multiplied with its undelayed version, and the results accumulated, the function R(T) 156 is obtained. The maximum value is obtained at zero lag and is simply a measure of the power in waveform 152. At large lags, the waveforms 152 are totally uncorrelated, so R(T) 156 approaches zero.

Figure 6A:
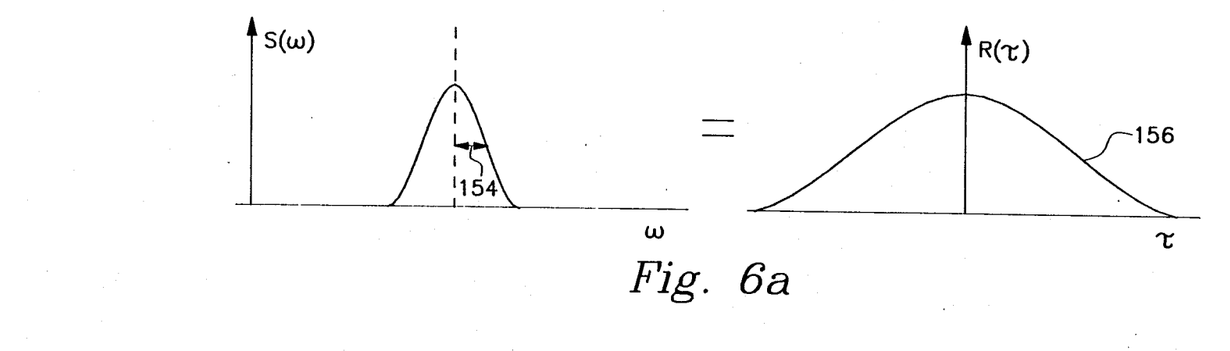
FIGS. 6a and 6b show the relationship between the power spectrum and the autocorrelation function.
Figure 6B:
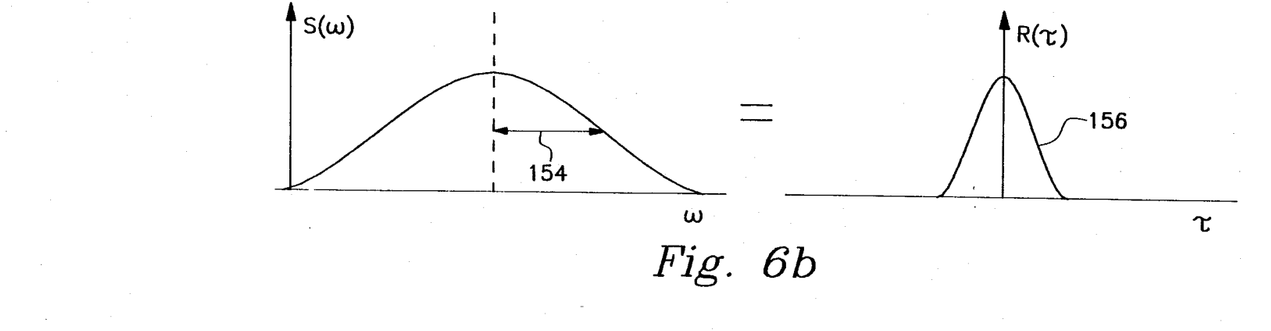

FIGS. 6a and 6b illustrate the relationship between spectrum width 154 and autocorrelation waveform 156. A narrow spectrum width 154 results in a slowly varying waveform 156, as shown in FIG. 6a. Therefore, a large lag T is necessary before waveforms 152 become uncorrelated so the autocorrelation waveform 156 is broad. A wide spectrum width 154, however, results in a rapidly varying waveform 156, as shown in FIG. 6b. Only a small lag is necessary to uncorrelate waveforms 152 so the autocorrelation is narrow. In other words, the spectral density w is the Fourier Transform of the autocorrelation function (T). A narrow spectral density yields a broad autocorrelation and a wide spectral density yields a narrow autocorrelation. In other words the spread required for effective discrimination increases as the spectral width increases.

Figure 7:
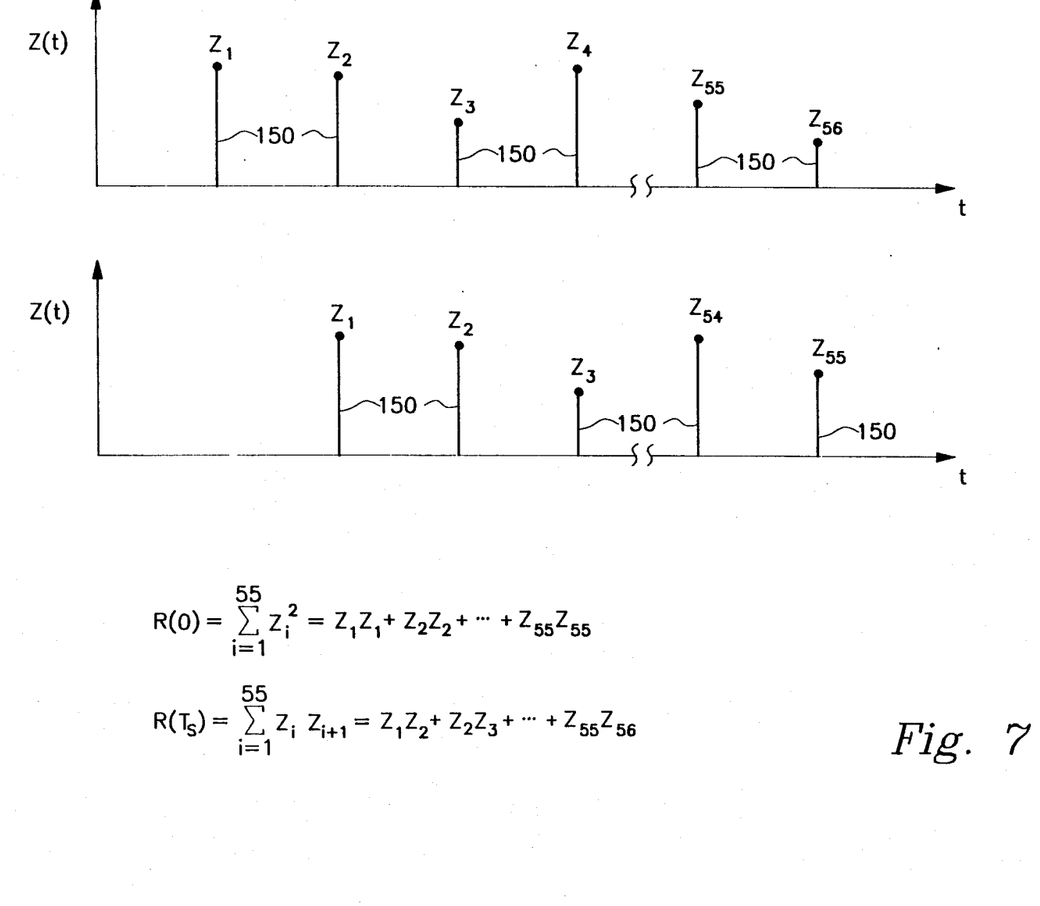
FIG. 7 shows a procedure for evaluating the autocorrelation function for a sampled signal.
Figure 8:
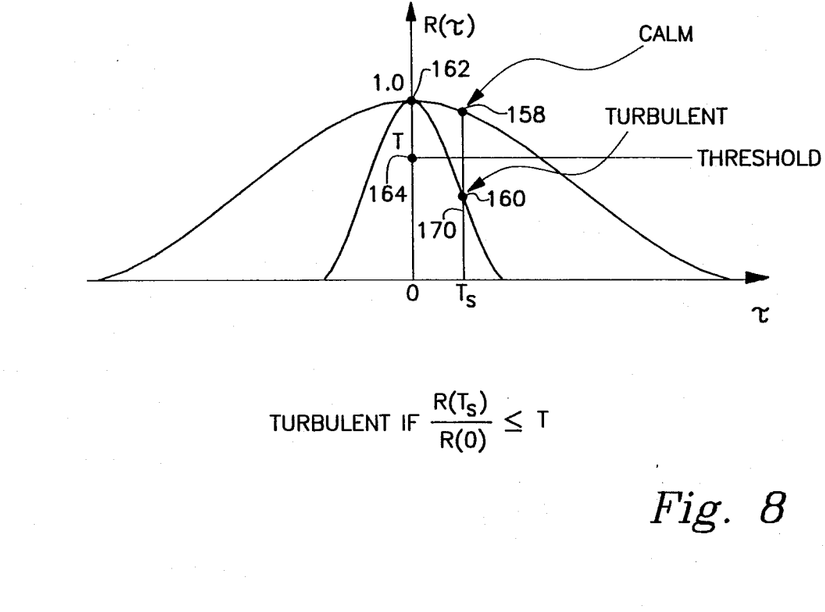
FIG. 8 shows the relationship between the autocorrelation function of calm and turbulent rainfall and the turbulence threshold.

FIG. 7 illustrates the mechanization of PPP. Instead of measuring the entire autocorrelation function, PPP only enables measuring the autocorrelation function of returns 150 at a lag T of zero and at a lag T of one radial 130. FIG. 8 illustrates how the two autocorrelation values 158 and 160, for calm and turbulent rainfall, respectively, are related. The autocorrelation value 162 at zero is used to normalize the values. If the rainfall is calm, the autocorrelation at a lag T of one radial 130 is close to one. However, if the rainfall is turbulent, the value is to close to zero. By setting a threshold value 164 somewhere between zero and one, various degrees of turbulence can be detected.

Helicopters use radars to detect oil platforms in high sea states. In this application, radar returns from the sea have a large amplitude variation while returns from the oil platform do not. Again, this is due to the movement of sea water between radials and the lack of movement by the oil platform. The present turbulence detector can be used to detect oil platforms (and reject sea clutter) by simply adjusting the threshold in figure to the proper value 164. If autocorrelation value 170 in FIGS. 8 and 9 of a range bin falls above threshold value 164, it is displayed (oil platform). However, if value 170 falls below threshold value 164, it is rejected (e.g., sea clutter). The same approach is used to reject ground clutter. In ground clutter rejection, range bins with an autocorrelation value 170 above threshold value 164 are considered as non-scintillating ground targets and are eliminated from display. Range bins with an autocorrelation value 170 below the threshold value 164 are considered as scintillating weather targets and are displayed.

Magnetron based transmitters have previously been regarded as being too unstable as frequency sources for systems as described here. The magnetron is not an amplifier, but an oscillator which oscillates at a frequency determined by device geometry, temperature, loading, and input current. Temperature and loading are subject to change during operation, but only in a long term. Current, however, can change instantly and affect the oscillation frequency. The "pushing figure" is the magnetron specification which relates the current through the tube with the output frequency. Using a constant current drive modulator that minimizes the "pushing" effect ($\Delta f/\Delta I$) of the magnetron on a pulse to pulse basis in conjunction with autocorrelation provided by digital pulse-pair processing results in a high-power, low-cost turbulence detection system.

Figure 9:
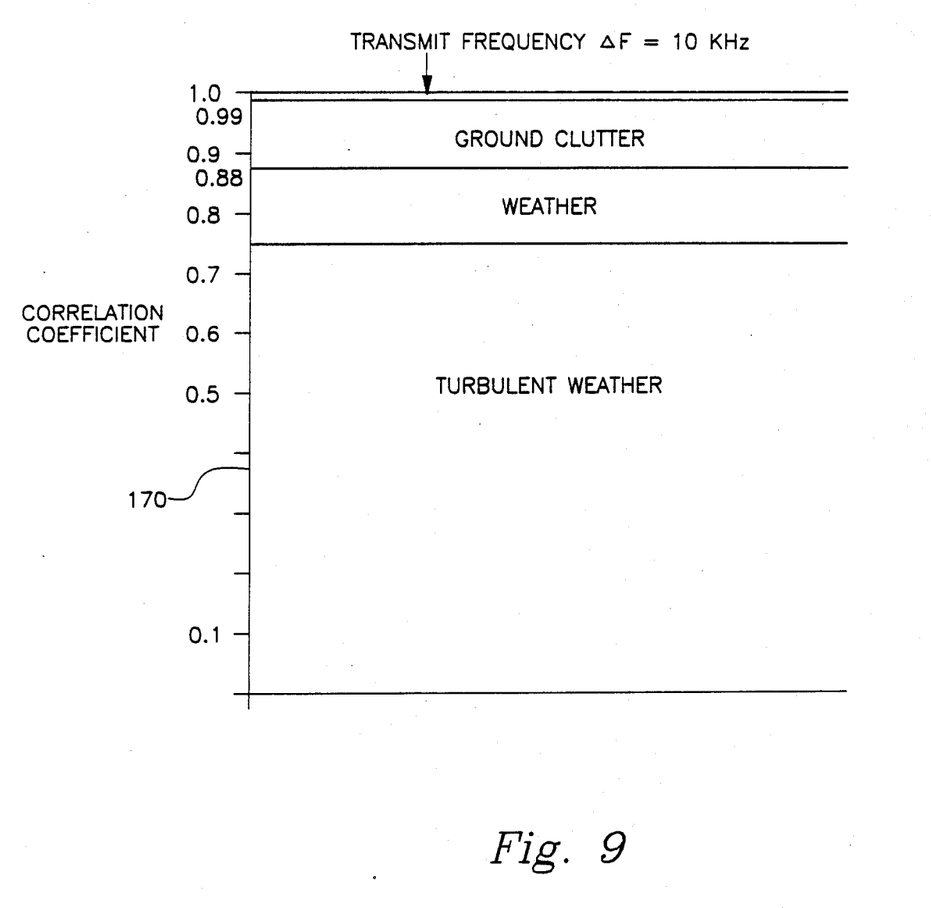
FIG. 9 shows correlation coefficients and the frequency stability necessary to maintain transmitted pulse correlation.

The turbulence detection process described herein utilizes the correlation or similarity of successive radar returns 150. The amount of correlation (value 170) which needs to be discerned is 88% which is the threshold between ground clutter and non-turbulent weather as is illustrated in FIG. 9. From this requirement, a minimum allowable correlation between successive transmit pulses of 99% has been assumed. This corresponds to a maximum frequency shift between pulses of 10 kHz.

Figure 10:
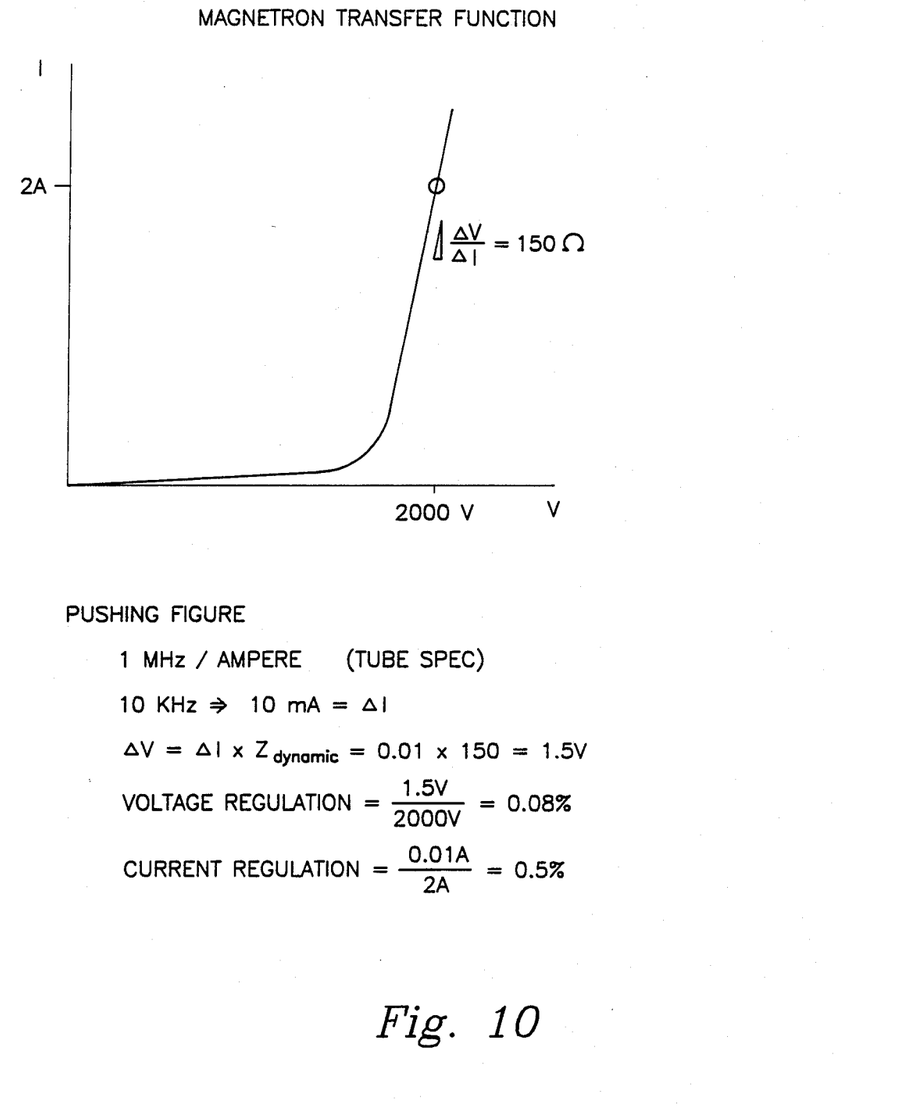
FIG. 10 shows the magnetron characteristics and necessary regulation to maintain frequency stability within 10 kHz.

The pushing figure is used to determine the requirements of the modulator circuitry. The magnetron tube used in this system has a pushing figure of 1 MHz/ampere. Thus, in order to keep the frequency shift below 10 kHz, the tube current must be controlled to within 10 milliamperes (mA). FIG. 10 illustrates the magnetron curve. At the operating point, the differential conductivity is relatively high and a small change in voltage results in a large change in current. If voltage regulation is used, as in previous radars, the magnetron voltage must be kept to within 0.08% which is very difficult to achieve. However, the current only needs to be regulated to 0.5% and this is much easier to achieve. Note that this regulation is only necessary on a pulse to pulse and intra-pulse basis. A constant shift of 100 mA, for example, would only produce a constant frequency offset and would not be detrimental to the system.

Figure 11:
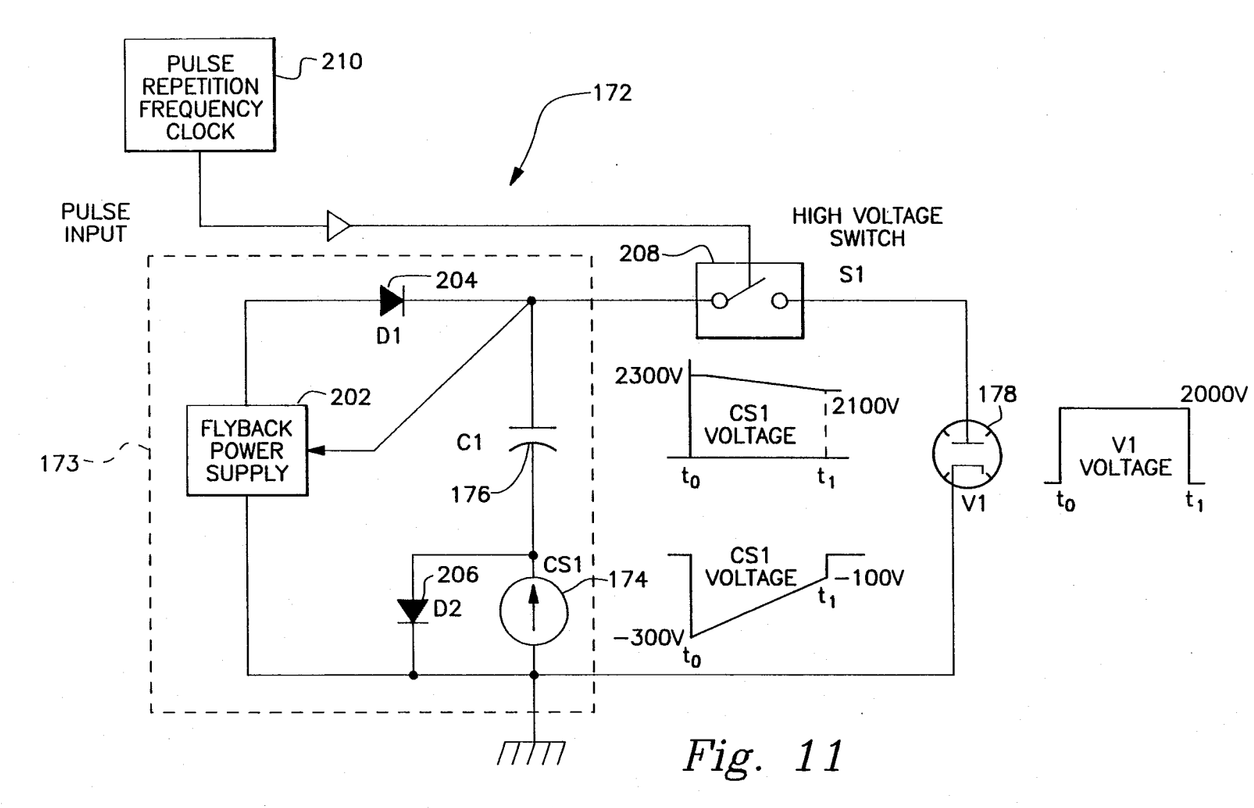
FIG. 11 is a schematic of a current regulating modulator.

FIG. 11 illustrates the implementation of constant current modulator 173. The current regulator 174 is placed below energy storage capacitor 176 and compensates not only the d.c. voltage regulation, but also the droop across storage capacitor 176 during a transmit pulse discharge of 2 amperes. This compensation of droop requires an energy storage volume which is only 3% of the volume necessary if current regulation is not used.

Transmitter 172 is configured as shown in FIG. 11. Flyback power supply 202 charges the energy storage capacitor (C1) 176 to 2300 volts through diodes (D1) 204 and (D2) 206. Diode 204 is used for rectification and diode 206 provides a reverse current path around the current source (CS1) 174. Transmitted pulses are generated when a pulse input from a pulse repetition frequency clock 210 closes high voltage switch (S1) 208. Capacitor 176 discharges through switch 208, magnetron 178 and current source 174 generating a 2000 volt pulse across magnetron 178 for the duration of the pulse input.

Figure 12:
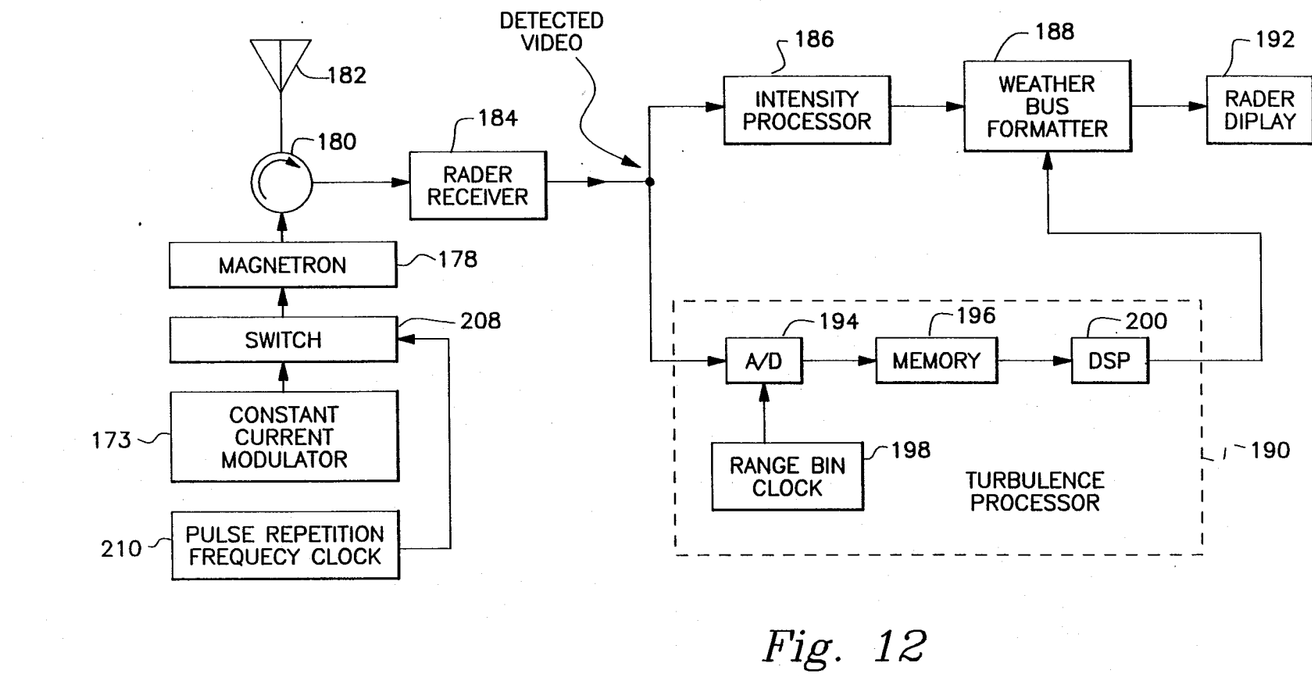
FIG. 12 is a diagram of a weather radar system having turbulence detection.

The invention is implemented as shown in FIG. 12. Magnetron 178 is fired using constant current modulator 173. The RF pulse generated passes through the circulator 180 and is radiated by antenna 182. The received radar echo is directed by circulator 180 to radar receiver 184 where it is amplified, filtered, and detected. The detected video is routed to intensity processor 186 and turbulence processor 190. The output of each processor is combined in weather bus formatter 188 and sent to radar display 192.

Turbulence processor 190 receives the detected video and digitizes it into range bins using an A/D converter 194. Range bin clock 198 is connected to A/D converter 194. The digitized video is stored in memory 196 for processing by digital signal processor (DSP) 200. The DSP 200 is a single Texas Instruments TMS32010 integrated circuit that performs the calculations illustrated in FIGS. 7 and 8. The results of the calculations, for each range bin, are sent to weather bus formatting circuit 188. This circuit, commonly known to those skilled in the art, simply combines the turbulence information with the intensity information and sends it to radar display 192.

The following is claimed:

1. A turbulence detector comprising:
    antenna means for radiating and receiving electromagnetic waves;
    a magnetron connected to said antenna means;
    receiving means, connected to said antenna means, for detecting data in the electromagnetic waves;
    processing means, connected to said receiving means, for processing the data into turbulence or clutter information, wherein said processing means comprises:
        an analog-to-digital converter connected to said receiving means;
        a clock connected to said analog-to-digital converter;
        a memory connected to said analog-to-digital converter; and
        a digital signal processor, connected to said memory and to said display means, for measuring variations between consecutive data and converting the variations into turbulence or clutter information, wherein said digital signal processor performs pulse-pair processing which involves an autocorrelation among a sequence of echoes to detect and compare amplitude variations of the echoes on a pulse-to-pulse basis, the pulses transmitted by said magnetron, wherein the amplitude variations reveal information of a degree of turbulence; and
    display means, connected to said receiving means and to said processing means, for displaying the information.

2. Apparatus of claim 1 further comprising a constant current modulator connected to said magnetron.

3. Apparatus of claim 2 wherein said constant current modulator comprises:
    a first junction connected to said magnetron;
    a second junction connected to said magnetron;
    a constant current source connected to said second junction;
    a capacitor connected to said constant current source and to said first junction;
    a flyback power supply connected to said second junction and to said first junction;
    a first diode connected to said flyback power supply and to said first junction; and
    a second diode connected to said constant current source and said capacitor, and to said second junction.

4. Apparatus of claim 3 further comprising:
    a high voltage switch connected between said first junction and said magnetron;
    a pulse repetition frequency clock connected to said high voltage switch; and
    a circulator switch connected between said magnetron and said antenna means, and between said receiving means and said antenna means.

5. Apparatus of claim 4 further comprising:
    an intensity processor connected to said receiving means; and
    a weather bus formatter connected to said intensity processor, to said digital signal processor, and to said display means.

6. A method for detecting turbulence comprising:
    transmitting a sequence of electromagnetic wave pulses at a constant frequency from a magnetron;
    maintaining said constant frequency with a constant current to said magnetron;

receiving echoes of said sequence of electromagnetic wave pulses transmitted;

pulse pair processing said echoes to detect turbulence, wherein said pulse-pair processing comprises:

measuring the amplitudes of said echoes, wherein each of said echoes is a vector sum of a plurality of wavelets reflected from a plurality of particles impinged by a transmitted electromagnetic wave pulse;

comparing measured amplitudes of said echoes of successive transmitted pulses;

identifying variations of said measured amplitudes as indications of turbulence;

setting a threshold value between zero and one for detecting various degrees of turbulence;

adjusting said threshold value for rejecting sea clutter or ground clutter;

determining whether an autocorrelation value of a range bin falls below or above said threshold value, wherein each echo constitutes one radial divided into a plurality of range bins or segments; and correlating echo amplitudes of said range bins; and maintaining said constant current to said magnetron with a constant current modulator.

* * * * *